United States Patent

Royer

[15] 3,659,670

[45] May 2, 1972

[54] EQUALIZER BAR FOR USE IN TRACKED VEHICLES

[72] Inventor: Clady J. Royer, P.O. Box 75181, Oklahoma City, Okla. 73107

[22] Filed: Dec. 11, 1969

[21] Appl. No.: 884,192

[52] U.S. Cl. .................................................. 180/9.5
[51] Int. Cl. ................................................. B62d 55/08
[58] Field of Search ................................ 180/9.5, 9.6

[56] References Cited

UNITED STATES PATENTS

| | | | |
|---|---|---|---|
| 2,022,080 | 11/1935 | Eberhard | 180/9.6 |
| 2,474,514 | 6/1949 | Burks | 180/9.6 |
| 2,792,140 | 5/1957 | Schwartz | 180/9.5 X |
| 2,863,516 | 12/1958 | Peterson | 180/9.5 |
| 2,978,050 | 4/1961 | Risk | 180/9.5 |
| 3,198,275 | 8/1965 | Royer | 180/9.6 |

Primary Examiner—Richard J. Johnson
Attorney—Dunlap, Laney, Hessin & Dougherty

[57] ABSTRACT

An equalizer bar for supporting the body and engine structure of tracked vehicles on a pair of horizontally spaced, longitudinally extending trucks. The bar is an elongated element having a central web portion and a pair of flanges secured to the opposed longitudinal edges of the web portions to form an I-shaped cross-section for the equalizer bar over a major portion of its length. The flanges converge towards the ends of the bat and merge in end portions, and the web portion is flared in a horizontal direction adjacent the opposite end portions of the bar to provide further reinforcement. A strengthening column is provided at the central portion of the bar for further strengthening the bar. Wear plates are secured on the under side of the opposite end portions of the bar for forming the surfaces of the bar in contact with the opposed, track carrying trucks of the vehicle.

2 Claims, 6 Drawing Figures

PATENTED MAY 2 1972
3,659,670
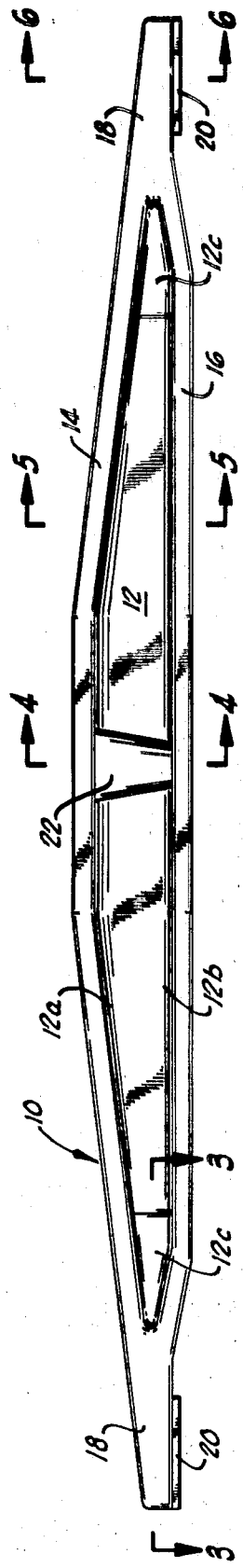
Fig. 1
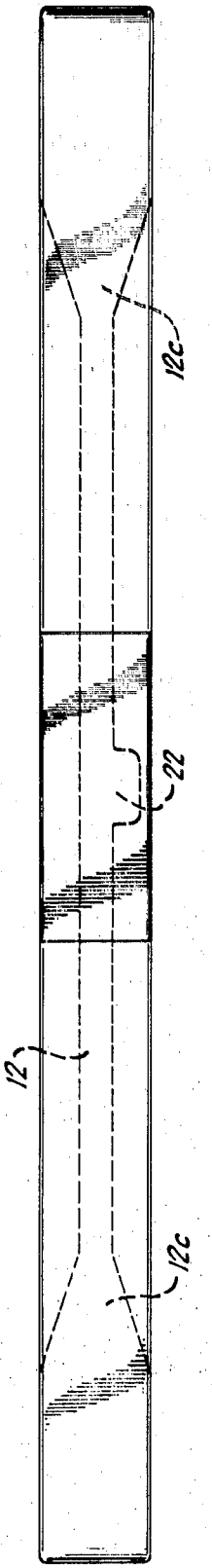
Fig. 2
Fig. 4  Fig. 5  Fig. 6
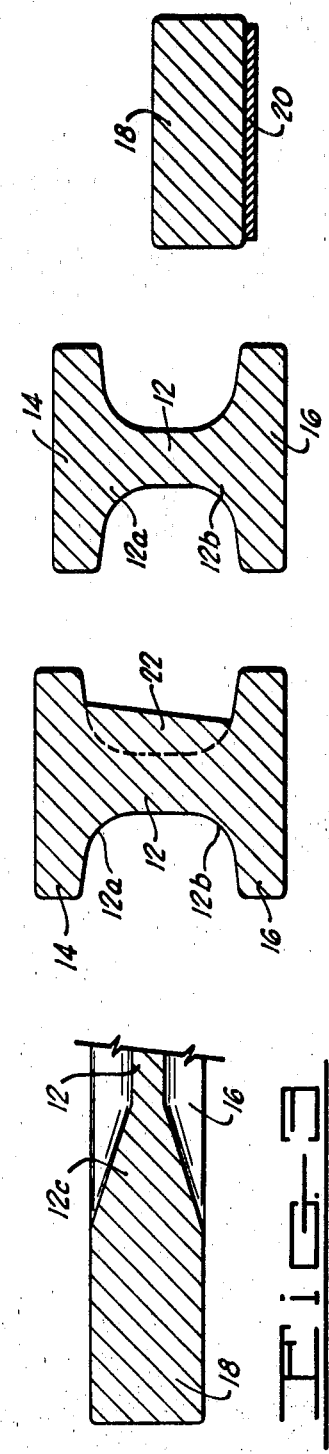
Fig. 3
INVENTOR.
CLADY J. ROYER
BY
Dunlap, Laney, Hessin & Dougherty
ATTORNEYS

EQUALIZER BAR FOR USE IN TRACKED VEHICLES

BACKGROUND OF THE INVENTION

1. Field of the Invention

This invention relates to an equalizer bar of the type used to support the body and engine structure of tracked vehicles. More particularly, the present invention relates to an improved equalizer bar suspension for supporting the main frame of tracked type vehicles upon the trucks.

2. Brief Description of the Prior Art

Crawler tractors of the general type manufactured by the Caterpillar Tractor Company of Peoria, Illinois, and including a main tractor frame or chassis which is adapted to be suspended on a pair of laterally spaced, longitudinally extending trucks, are widely used for dirt moving and landscaping operations. In vehicles of the type described, the main tractor frame or chassis, including the engine and the major portion of the weight of the entire vehicle, is carried in large part by an equalizer bar which partially supports the frame and distributes the weight of the frame and engine to each of the laterally spaced trucks which carry the endless tracks of the vehicle.

The equalizer bar has the function of permitting relative oscillatory and pivotal movement in vertical planes of the trucks carrying the endless tracks, or other similarly operable ground engaging mechanisms, but yet maintaining substantially equal weight distribution of the vehicle body and main frame upon the trucks, and also maintaining a substantially level status of the main frame during relative movements between the trucks as the vehicle moves over uneven terrain.

An improved equalizer bar providing the described functions in its utilization in conjunction with tracked vehicles of the type described is depicted and discussed in my U.S. Pat. No. 3,198,275 issued on Aug. 3, 1965. The equalizer bar there shown is an elongated member of generally trapezoidal elevational appearance, having a central web which has two flanges secured to the opposed longitudinal edges thereof, with these flanges converging and merging at each of the opposite ends of the bar. The central portion of the beam thus has a generally I-shaped cross-section. The bar functions to distribute the weight of the framework and engine of the vehicle evenly to the laterally spaced trucks of the vehicle, and the bar is made to merely rest slidingly upon the opposed trucks so that it can accommodate itself to changes in the relative position of the two trucks and of the main frame of the tractor without sustaining excessive metal fatigue.

BRIEF DESCRIPTION OF THE PRESENT INVENTION

The present invention comprises an improvement to the equalizer bar described in the cited patent. The equalizer bar of the present invention is adapted for use on a wider variety of tracked vehicles, is substantially stronger in construction and is characterized in having a longer operating life than is the equalizer bar referred to and discussed in the cited patent.

Broadly described, the equalizer bar of the present invention constitutes a unitary elongated beam which comprises a central web portion extending generally in a vertical plane over a major portion of its length, and having a pair of generally horizontally extending flanges secured to the opposed longitudinal edges of the web portion. The web portion tapers in its vertical dimension from the central portion of the elongated beam to the outer ends thereof so that the flanges merge with each other at the outer end portions of the beam. Inwardly toward the center of the beam from these outer end portions, the web is flared in a horizontal direction to provide substantially enhanced strength to the beam at a location where substantial portion of the load and bending moment is imposed during use of the beam.

There is further provided a central columnar portion which extends vertically between the opposed flanges of the beam and further strengthens the beam. Both the lower edge of the web portion of the beam and the flange which is secured thereto are dimensioned so that there is a downward projection of the lower portion of the beam from the plane of the two end portions so that the beam can be accommodated to different types of mounting arrangements than those which characterize the mounting arrangements used for mounting the equalizer bars described in U.S. Pat. No. 3,198,275. At the opposite end portions of the beam, suitable wear plates are secured by welding or other suitable means to the lower face of these end portions so that the wear plates may contact the trucks upon which the opposite ends of the beam are rested during use of the equalizer bar.

An important object of the present invention is to provide an improved equalizer bar which is considerably stronger, and is characterized in having a longer and more trouble-free operating life, than those heretofore proposed.

Another object of the invention is to provide an equalizer bar which is less susceptible to fracturing at points of heavy loading than equalizer bars of the type heretofore proposed.

A further object of the invention is to provide an equalizer bar which can be used with different leaf spring mounting arrangements than has been characteristic of other equalizer bars as previously constructed.

Other objects and advantages of the invention will become apparent as the following detailed description of the invention is read in conjunction with the accompanying drawing which illustrated the invention.

BRIEF DESCRIPTION OF THE DRAWINGS

FIG. 1 is a front elevation view of the equalizer bar of the present invention.

FIG. 2 is a plan view of the equalizer bar of the present invention depicting the location of the web portion in dashed lines.

FIG. 3 is a sectional view taken along line 3—3 of FIG. 1.

FIG. 4 is a sectional view taken along line 4—4 of FIG. 1.

FIG. 5 is a sectional view taken along line 5—5 of FIG. 1.

FIG. 6 is a sectional view taken along line 6—6 of FIG. 1.

DETAILED DESCRIPTION OF A PREFERRED EMBODIMENT OF THE INVENTION

Referring initially to FIG. 1 of the drawings, the equalizer bar of the invention is designated generally by reference numeral 10 and includes a central web portion 12 which is a vertically extending member having opposed longitudinally extending edges 12a and 12b. It will be noted in referring to FIG. 1 that the opposed longitudinal edges 12a and 12b of the web 12 are substantially equidistantly spaced over the central portion of the web, then converge toward each other from this central portion outwardly toward the opposed end portions of the web. It will also be noted in referring to FIGS. 2 and 3 that the web 12 has flared opposed end portions 12c at which the web 12 is flared outwardly so that the web becomes broader in a horizontal sense.

Secured to the upper longitudinal edge of the web 12 is an upper flange 14. A lower flange 16 is secured to the lower longitudinal edge of the web 12. It will be noted that the flanges 14 and 16 converge at the opposite ends of the equalizer bar to provide solid end portions 18. The flared end portions 12c of the web 12 merge with the end portions 18 of the equalizer bar and it may be perceived that the thickness of the bar and the flaring of the web portions 12c provide end portions which are of substantially enhanced strength, and thus not as susceptible to fracturing due to the imposition of bending moments at this location.

Secured to the lower surfaces of the opposed end portions 18 of the equalizer bar are a pair of wear plates 20. These wear plates are made of hardened metal and can sustain the frictional wear imparted thereto by the contact of the wear plates with the supporting surfaces on the trucks located at opposite sides of the tracked vehicle. Reference is made to U.S. Pat. No. 3,198,275 for the manner in which the equalizer bar 10 is mounted in the tractor to support the framework and the engine of the vehicle on the horizontally spaced trucks. At a central portion of the equalizer bar 10, and extending between the upper flange 14 and the lower flange 16 is a vertically extending strengthening column 22 which is protuberant from the web 12 and provides further support to the flanges 14 and 16 and strengthens the beam at the central portion thereof. The column 22 is not an essential part of the equalizer bar of the present invention, but is preferred for inclusion therein because of the gain in strength derived from the inclusion of this column.

It will be noted that the lower flange 16 of the equalizer bar does not lie in a common plane, but rather diverges downwardly so that the major portion of its length is in a plane which is lower than that occupied by the wear plates 20. This construction permits the bar to be used in types of tracked vehicles now being manufactured in which the springs utilized in conjunction with the equalizer bar adjacent the central portion thereof, as depicted in my U.S. Pat. No. 3,198,275 and denominated therein by reference character 52, are of lesser height (that is, include fewer leaves). In such constructions, the greater central thickness of the equalizer bar 10, as compared to the type of equalizer bar depicted and described in said patent, permit the bar of the present invention to be used with the more recent constructions of tracked vehicles of the type there depicted where the geometry of the spring configuration is varied.

Although the method of mounting the equalizer bar of the invention, and the manner of its function when mounted, constitute no part of the present invention, such method of mounting and the general functions ascribable to the bar can be ascertained by reference to my U.S. Pat. No. 3,198,275 and also to Eberhard U.S. Pat. No. 2,022,080. When the bar is mounted in the described position with the outer end portions 18 resting upon the opposed trucks of the tracked vehicle, and with the central portion supporting the framework and engine, the bar equally distributes the weight of the central framework and engine to the trucks and maintains such equal distribution of the load during oscillating movements of the trucks as the vehicle traverses uneven terrain. By reason of the construction of the outer end portions of the bar 10, and particularly, the manner in which the outer end portions 12c of the web 12 are flared, the bar does not tend to fracture at these locations, and a substantially longer operating life is experienced.

Although certain preferred embodiments of the invention have been herein described in order to illustrate the basic principles of the invention, it is to be understood that various changes and modifications in the described structure can be effected without departure from these basic principles. All changes and innovations of this type are therefore deemed to be circumscribed by the spirit and scope of the invention except as the same may be necessarily limited by the appended claims or reasonable equivalents thereof.

What is claimed is:

1. An equalizer bar of the type used for supporting a frame and engine on the horizontally spaced trucks of a tracked vehicle, said bar comprising:
    an elongated web portion extending along the bar and having opposed longitudinal edges, said web portion increasing in its dimension between said longitudinal edges from the opposite ends thereof inwardly toward the center of the web portion, said web portion flaring to an increased thickness at locations adjacent the opposite ends of said web portion, and wherein said web portion is generally trapezoidal in configuration, having said opposed longitudinal edges extending parallel to each other at the central part of said web portion, and convergent on opposite sides of said central part;
    a pair of flanges secured to the opposed longitudinal edges of said web portion and converging to merge with each other at opposite ends of the bar to form relatively thick end portions at opposite ends of said web portion, said equalizer bar being I-shaped in cross-section between said relatively thick end portions;
    wear plates secured to each of said end portions, said wear plates being in substantially co-planar alignment, and wherein a major portion of the one of said flanges disposed on the same side of said bar as said wear plates lies in a plane disposed on the opposite side of the common plane of said wear plates from said relatively thick end portions.

2. An equalizer bar as defined in claim 1 and further characterized in having a rigid column extending between said flanges, and disposed on one side of said web portion at substantially the center thereof.

* * * * *